(12) United States Patent
Williams

(10) Patent No.: US 11,584,207 B2
(45) Date of Patent: Feb. 21, 2023

(54) SMART TONNEAU COVER WITH SOLAR PANELS AND AUTOMATIC WEATHER SENSING

(71) Applicant: Toyota Motor Engineering & Manufacturing North America, Inc., Plano, TX (US)

(72) Inventor: Clinton J. Williams, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 205 days.

(21) Appl. No.: 17/161,746

(22) Filed: Jan. 29, 2021

(65) Prior Publication Data

US 2022/0242210 A1 Aug. 4, 2022

(51) Int. Cl.

| B60J 7/14 | (2006.01) |
|---|---|
| B60J 7/16 | (2006.01) |
| B60J 7/12 | (2006.01) |
| B60L 8/00 | (2006.01) |
| B60K 16/00 | (2020.01) |

(52) U.S. Cl.
CPC ............ B60J 7/141 (2013.01); B60J 7/1204 (2013.01); B60J 7/1607 (2013.01); B60L 8/003 (2013.01); B60K 2016/003 (2013.01); B60L 2200/36 (2013.01)

(58) Field of Classification Search
CPC ....... B60J 7/14; B60J 7/141; B60J 7/16; B60J 7/1607; B60J 7/1614; B60L 8/003; B60P 7/02

USPC ............ 296/100.02, 100.06, 100.1
See application file for complete search history.

(56) References Cited

U.S. PATENT DOCUMENTS

| 6,448,740 | B1 | 9/2002 | Kirkpatrick | |
|---|---|---|---|---|
| 7,518,327 | B2 | 4/2009 | Newman et al. | |
| 7,884,569 | B2 | 2/2011 | Ward | |
| 10,286,763 | B2 | 5/2019 | Capiak et al. | |
| 10,406,896 | B2 * | 9/2019 | Ford | B60J 7/041 |
| 10,436,152 | B2 | 10/2019 | Dudar | |
| 10,596,887 | B2 | 3/2020 | Rossi et al. | |
| 11,105,139 | B2 * | 8/2021 | Junod | B60J 7/141 |
| 2004/0164578 | A1 * | 8/2004 | Mack | B60P 3/423 296/10 |
| 2006/0170239 | A1 * | 8/2006 | Altman | B60J 7/1614 296/100.06 |
| 2008/0116711 | A1 * | 5/2008 | Thacker | B60J 7/1614 296/107.07 |
| 2008/0174142 | A1 * | 7/2008 | Pearlman | B60J 7/1614 296/100.1 |
| 2013/0328348 | A1 | 12/2013 | Agnew | |

(Continued)

*Primary Examiner* — Jason S Daniels
(74) *Attorney, Agent, or Firm* — Christopher G. Darrow; Darrow Mustafa PC

(57) ABSTRACT

A smart tonneau cover for a pickup truck includes an input system that receives information concerning a route and the weather forecast for the route to a destination, the height of a cargo, a precipitation sensor, a wind sensor, and to determine the limits to the height, position, and orientation of the portions of a tonneau cover, which can include solar panels that can be moved to optimize power generation and minimize power consumption while protecting the cargo. The solar panels can be positioned when stationary, such as while parked, and repositioned as needed during transit to maintain an optimal power efficiency.

20 Claims, 9 Drawing Sheets

(56) References Cited

U.S. PATENT DOCUMENTS

2015/0251539 A1  9/2015  Sura et al.
2019/0334039 A1  10/2019 Boyd et al.

* cited by examiner

SMART TONNEAU COVER WITH SOLAR PANELS AND AUTOMATIC WEATHER SENSING

TECHNICAL FIELD

The present disclosure generally relates to sun positioning and weather sensing and, more particularly, to detecting weather conditions and the position of the sun relative to solar panels in a tonneau cover.

BACKGROUND

Tonneau covers for a pickup truck bed are a common aftermarket addition to allow securing of cargo in the bed and to protect cargo from the elements as desired. The typical tonneau cover is secured to bed rails on the side walls of the bed and may be removed or retracted manually or with the aid of a motor. The tonneau cover does not necessarily improve the aerodynamics of the truck and often increase drag relative to the uncovered bed. The tonneau cover often seals the bed in a manner that allows heat generated by sun exposure to promote wear and damage to the vehicle if not to its cargo. Even with a motor driven mechanism to apply and remove the cover, the elements can surprise the driver and the cargo is exposed to sudden weather changes during travel.

A solar panel has been employed as the top exterior surface of a tonneau cover. The flat panel is fixed in an orientation, generally parallel to the bed of the truck, but has been designed to extend from the roof of the truck, such as, at the front wall of the bed, to the top of the tail gate such that the surface area for solar energy absorption can be enhanced. The solar panel can be elevated at one end to receive more direct sunlight. Solar panels are at their greatest efficiency when they are at an optimal angle to the sun, hence, their efficiency varies significantly on the time of day, the direction of travel, and the slope of the road.

Accordingly, it would be desirable to provide a tonneau cover that is capable of adjusting with the weather and to allow an enhanced solar power generation, and to this end a system that can automatically adjust to the conditions is highly desirable.

SUMMARY

This section provides a general summary of the disclosure and is not a comprehensive disclosure of its full scope or all its features.

In various aspects, the present teachings provide a pickup truck having a tonneau cover coupled to a system for sensing the weather conditions and light intensity to automatically respond to these conditions without the input of an operator, although the operator can override the automatic response and input the priorities for the automatic decisions carried out by the system. The system includes sensors for the detection of the cargo's height, rain, wind, temperature, motion, direction, and/or light to allow detection of precipitation, wind shear, excessive heat in the bed covered by the tonneau cover, and the relative position of the tonneau cover to the sun, such that a controller receiving the input can activate a mechanism to adjust the state of at least a portion of the tonneau cover to optimize the functions of the tonneau cover. For example, the tonneau cover can have a portion that is moved to change the degree to which the bed is covered or to orient one or more portions of the tonneau cover relative to the orientation of the pickup truck. The tonneau cover may be a roller cover, accordion style cover, a soft cover, or a hard cover, where the proportion of the bed covered by the tonneau cover may be modified in a stationary or moving pickup truck, and the angle of one or more portions of the tonneau cover may be varied relative to a defining plane of the truck's bed. In this manner, the bed may be covered during rain, vented when excessively hot, and may have one or more solar panels oriented to maximize generation of power by the cells in the solar panel(s). The sensors provide input to one or more processors that direct the mechanisms for positioning of the tonneau cover to allow the optimal protection of the cargo and while achieving the optimal protection, optimize the power efficiency of the pickup truck by a minimization of the power consumption and a maximization of power generation to assure or extend the range of a planned trip.

In other aspects, the present teachings provide a method for optimizing the environment of a pickup truck bed, where the degree and mode of the covering is automatically altered to establish the best orientation and configuration of the tonneau cover. The method allows changing the portion of the tonneau cover that is covering the bed and the orientation of one or more portions of the cover. In this manner, the state of the bed and the ability to generate power via solar cells can be optimized to protect the cargo from water, maintain acceptable temperatures in the bed, and to generate power for use in the bed and/or cab or to provide power for charging of supplementing the batteries of an electronic vehicle (EV). Alternatively, the pickup can be a vehicle powered by an internal combustion engine (ICE) where a frequent cargo requires electricity, or a hybrid vehicle that can function as an autonomous, semi-autonomous, or operator driven vehicle.

In other aspects, the present teachings provide for a pickup truck that can optimize its loads environment, minimize the bed's temperature, generate electricity, and/or achieve a lower drag in optimal fashion such that a range of the vehicle can be extended by the presence of the solar panel(s). The pickup truck possesses a tonneau cover that can be altered when in rest or in motion. Optimization can occur with the parked vehicle while maintaining a secure load or with the moving vehicle, such that the goals of cargo protection, range, energy production, and passenger comfort are appropriately balanced and optimized by the activation and positioning of the portions of the tonneau cover.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1A:
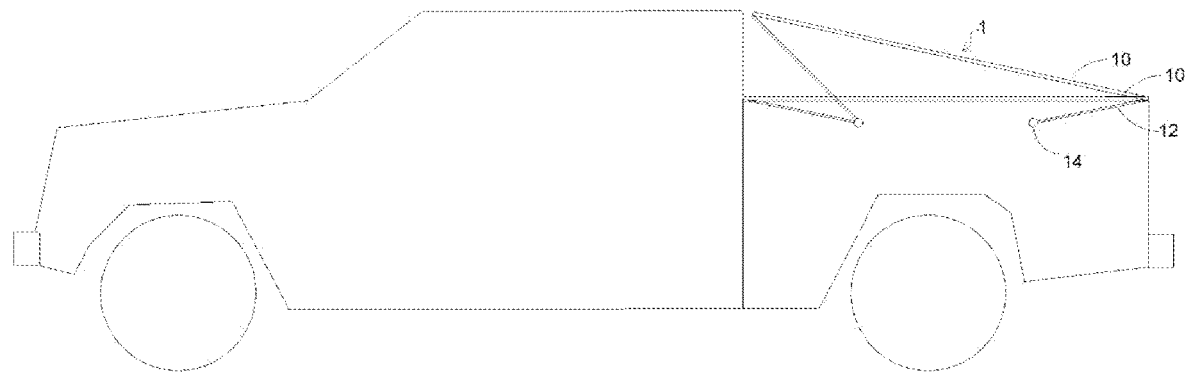
FIG. 1A is a drawing of a pickup having a tonneau cover including a single solar panel of the size of the bed where an elevator and pivot allow the raising of the panel from the bed surface to a height of the cab roof.

It should be noted that the figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate features from a combination of figures.

DETAILED DESCRIPTION

The present technology generally provides for an improved tonneau cover, and includes systems and methods to automatically position one or more portions of a tonneau cover for a type of vehicle generally referred to as a pickup truck, for example, to optimize the function of the tonneau cover to enhance the protection of cargo and otherwise optimizing the performance of the pickup truck. The portions of the tonneau cover are coupled to a system for inputting a destination and selecting a route that optimizes the power efficiency while optimally protecting the cargo and sensing the weather conditions and light intensity to automatically responding to these conditions without necessitating the input of an operator beyond the inputting of a destination in some manner. At least one sensor to determine the height of the loaded cargo over the bed floor allows determination of the minimal height limits to the tonneau cover or sections of the tonneau cover for automatic raising and lowering of any portions thereof. An operator can override the automatic response as needed. The operator can also input the priorities for the multiplicity of responses that must be considered to make the automatic decisions carried out by the system. The system includes one or more sensors for the detection of rain, wind, temperature, motion, direction, location, and/or light to allow detection of precipitation, wind shear, excessive heat in the bed covered by the tonneau cover, and the relative position of the tonneau cover to the sun. These sensors provide a signal to one or more controllers where the input is used to assess the present conditions of the portions of the tonneau cover and make determination of needed corrections for placing the portions in their optimal position to achieve a desired function of these portions. A controller can activate one or more devices to mechanically adjust the state of at least a portion of the tonneau to oblige the components of the tonneau cover to optimize their functions based on a priority of conditions that are most advantageous to protecting a cargo and optimizing the highest prioritized functions concerning the circumstances of the environment and requirements of any trip in progress.

The controller can actuate mechanical devices that address at least a portion of the tonneau cover to partially or fully: open a port within the cover; retract or extend the portion of the cover; ascend or descend the portion of the cover; tilt the portion on a first axis aligned with the truck's direction for travel; and/or tilt the portion on a second axis perpendicular to the truck's direction of travel. For example, the tonneau cover can have a portion thereof moved to change the degree to which the bed is covered or to orient one or more portions of the tonneau cover relative to the orientation of the pickup truck.

The tonneau cover may be a roller cover, accordion style cover, a soft cover, or a hard cover, where the proportion of the bed covered by the tonneau cover may be modified in a stationary or moving pickup truck and the angle of one or more portions of the tonneau cover may be varied relative to a defining plane of the truck's bed given the trucks orientation and position relative to: the earth's axis; the time of day; pitch of the truck; need for protection of the cargo; optimization of handling; optimization of energy economization; and need to provide power for the bed, cab, or powertrain. In this manner, the bed may be, for example, covered during rain or snow, actively or passively vented when excessively hot, and positioned to minimize drag or wind shear that the pickup truck may encounter on a trip. The tonneau cover may include one or more solar panels that can be automatically oriented to maximize the generation of power by the cells in the panel(s).

The present disclosure provides a method to: assess the environment in contact with a pickup truck's tonneau cover; assess the environmental conditions relative to priorities for the cargo's safety, passenger's comfort and safety, and pickup trucks efficient functioning; and implementing mechanical actions to modify the orientation of various portions of the cover to optimize the function of devices of that portion and/or to optimize a function performed by the complete tonneau cover. The environment may generally be assessed using sensors.

One or more rain sensors can be employed. The rain sensor can be one that is presently included in the pickup truck to control the windshield wipers or may be an independent sensor included to specifically control the tonneau cover. Commonly, a rain sensor is a device that functions by the loss of total internal reflected infrared light upon wetting of the surface and can also detects snow as it melts on the surface of the windshield or other surface employed by the sensor. Any other type of rain or precipitation sensor can be used. The rain sensor can provide a signal to a controller including a processor where the signal is received and to initiate a signal to a device used to extend the tonneau cover over the entire bed, and to seal against water incursion to the bed or to direct the flow of air and water from the tonneau cover such that it does not contact the inner surface and cargo included in the bed. The device can be based on a screw, an axle, or a belt or chain that can retract and extend a roll up, fold up, or any other form of a tonneau cover. As this tonneau cover can be provided as original equipment of a pickup truck, the tonneau cover can be retracted into a compartment that is included between the inner and outer walls of the bed. The cover can be rolled or folded from the back to the front and/or from one side to the other for storage.

The air velocity over the tonneau cover can be sensed by one or more anemometers that can be, for example, but not limited to, a vane anemometer, an ultrasonic anemometer, or an acoustic resonance anemometer. The direction of air flow can also be sensed by these air flow sensors. This information concerning the air flow can be used to modify any degree of opening or orientation of all or a portion of the tonneau cover, for example individual panels that may be oriented independently of each other. Additionally or alternatively one or more pressure sensors can allow the detection of an change in the balance of pressures across a portion of a tonneau cover such that an optimization of the portion's orientation can be performed, where a processor receives the signal from the anemometer or pressure gauges and calculates any compensation in vent opening or portion orientation required to optimize a desired function, or to provide the highest protection for the cargo from the elements that can be achieved by the tonneau cover.

One or more thermistors or other temperature sensors can be employed to sense the temperature of the ambient air outside of the bed and/or within the bed such that a controller receiving the signal can process any extending or retracting of the tonneau cover or one or more portions thereof or opening or closing vents in a portion of the tonneau cover to direct a controlled airflow through the bed to achieve cooling in the bed to a temperature that can be as low as the ambient air temperature without the use of a cooling source, although any vent may be equipped with a cooling means. In this manner cargo with contents that are heat sensitive can be transported without "cooking" of the contents. The portions of the tonneau cover need not all provide the same function and different portions of the tonneau cover may be of different sizes and shapes to best optimize the function of the combined portions of the tonneau cover.

The present technology generally provides a pickup truck having a tonneau cover that includes at least one solar panel to generate electrical energy, where the one or more solar panels may be oriented automatically to optimize power efficiency of the pickup truck by balancing the tonneau cover geometry to balance an aerodynamic loss with the gain of power generated by the solar panels. The generated power may be used to defer power use from batteries employed to drive the wheels, from ancillary functions such as heating and cooling of the passenger compartment, power entertainment modules, power lights, or provide power to the cargo box for desired functions therein, such as powering the sensors and mechanisms that open, close, and orient the portions of the tonneau cover, powering devices used in the bed for heating or cooling, charging equipment to be used at a destination end of the trip, directly powering equipment used at a destination, or storing power for charging or directly charging batteries of an electric or hybrid vehicle while mobile or when parked. The ability to charge a vehicle's batteries using solar cells has been estimated to possibly extend the range of vehicles by up to about 20 miles using fixed conventional solar panels having about 20 percent efficiency and nearly 40 miles with cells with 35 percent efficiency.

Figure 1B:
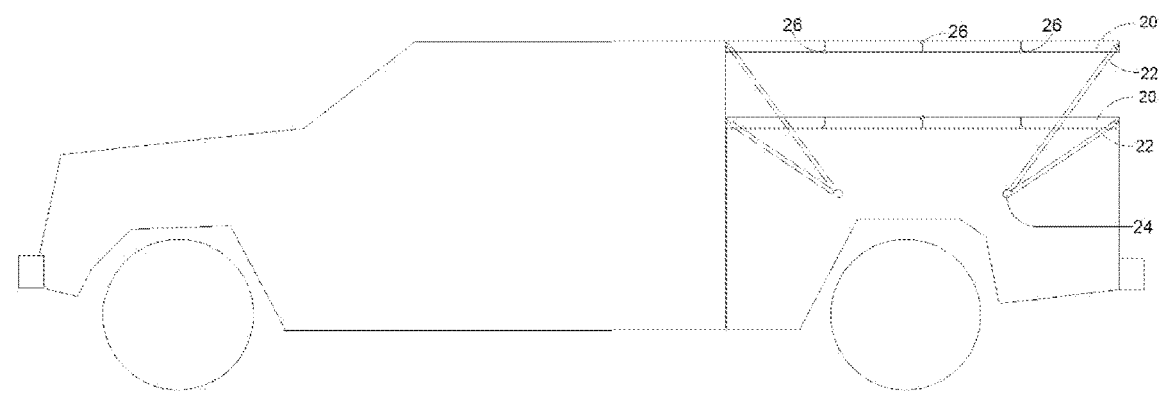
FIG. 1B is a drawing of a pickup having a tonneau cover including four solar panels connected as an ensemble of the size of the bed where an elevator and pivot allow the raising of the panel from the bed surface to a height of the cab roof.
Figure 1C:
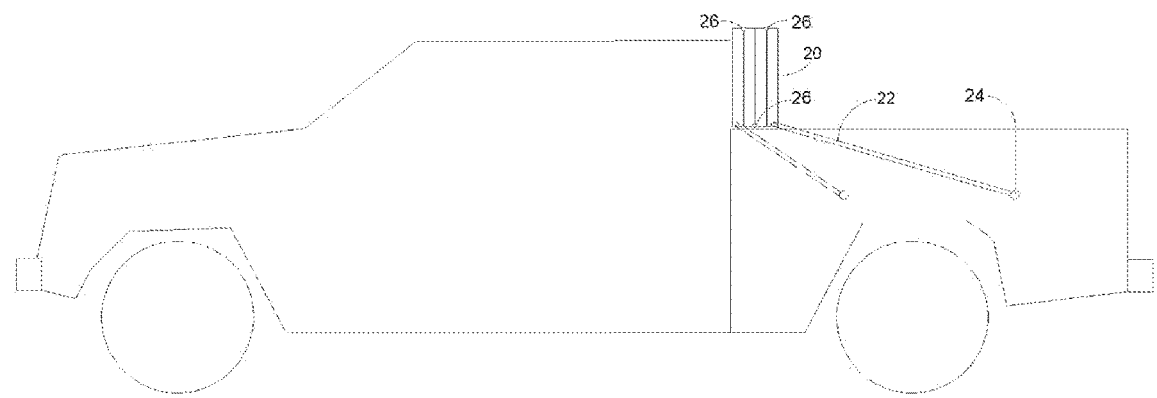
FIG. 1C is a drawing of a pickup having the tonneau cover including four solar panels of FIG. 1B where the ensemble of panels is folded to expose most of the bed.

The solar panels can be of various types and of various sizes and number such that different designs of the tonneau cover can be employed. For example, the panels can be of monocrystalline, polycrystalline, or thin-film cells. The size of the panels can vary as required for allowance of the tonneau cover to roll or fold or retraction. For example, using the size of a typical non-flexible solar cell used in a residential panel of about 6 inches per side, a typical pickup truck bed can have a single panel that is ten by ten or twelve by sixteen cells to give a 100 or 192 cell panel or ensemble of panels, for a short bed or long bed, respectively, to generate, for example, about one half to one kW when appropriately oriented toward the sunlight. Although one or more panels can be fixed to a static base, the elevation and orientation of the one or more panels can be altered by a device that alters the elevation of a side of the panel to alter the angle relative to the bed and where the one or more panels can be transposed longitudinally and in elevation. For example, as shown in FIG. 1A, a single solar panel 10 of a tonneau cover 1 can rest on the bed of the pickup truck or via elevators, such as telescopic hoist, 12 that rotates from a pivot 14 within or attached to the side-wall of the bed, such that solar panel 10 can be raised, where as illustrated, but not limited, to the height of the cab roof. Although shown with four elevators, two or more elevators can be employed. The pivot 14 and the elevator 12 can be locked in place to allow any desired angle and extension within the limits imposed by the panel 10 and the pickup truck's geometry. The tonneau cover can include a single panel 10, as shown in FIG. 1A, or can be two or more panels, as will be addressed below. For example, as shown in FIG. 1B, a tonneau cover is constructed from four hinged panels 20 that can be elevated and lowered by elevators 22 in conjunction with pivots 24, where the panels are connected by hinges 26, allows the panels to be folded, as illustrated in FIG. 1C, into a compact ensemble to allow nearly complete access to the bed. Although not illustrated, for a tonneau cover that is constructed of a flexible solar panel or a combination of panel with a sufficiently large number of ridged panels, the panel(s) can be rolled or otherwise contracted on into a storage point in or panels adjacent to the bed. Covering panels or sheets can be employed that connect, as desired, the sides of the tonneau cover to the bed while allowing a variety of positioning of the solar panels. These covering panels may be hard plastics, soft plastics, elastomers, and may be employed as single panels or as a combination of a plurality of panels to achieve a desired covering.

Figure 2A:
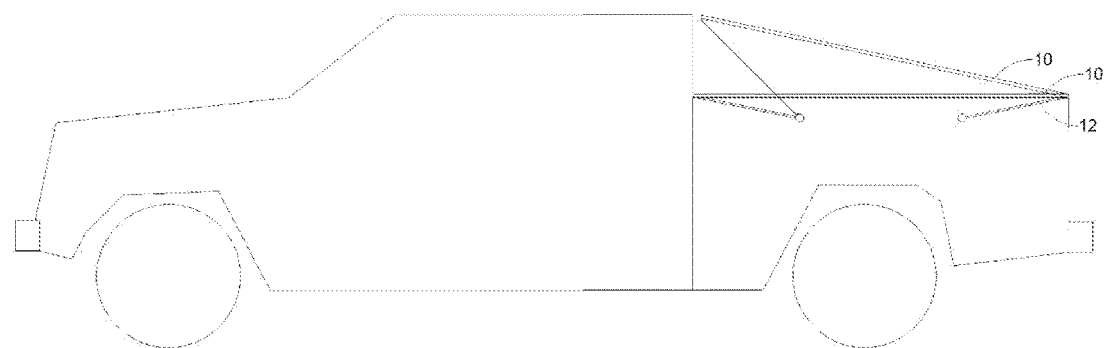
FIG. 2A is a drawing of a pickup having the tonneau cover of FIG. 1A where a forward pair of the elevators and pivots are extended to direct the surface of the solar panel to the rear of the pickup truck.
Figure 2B:
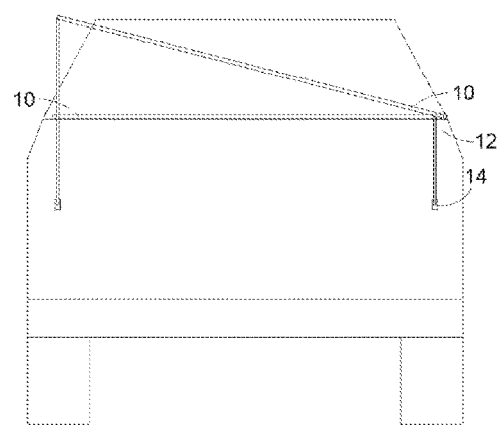
FIG. 2B is a drawing of a pickup having the tonneau cover of FIG. 1A where a pair of the elevators and pivots on the driver side are extended to direct the surface of the solar panel to the passenger side of the pickup truck.
Figure 2C:
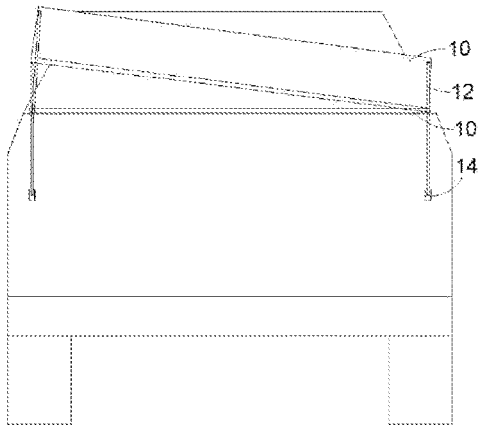
FIG. 2C is a drawing of a pickup having the tonneau cover of FIG. 1A where three of the elevators and pivots on the driver side are extended to different degrees to direct the surface of the solar panel to the passenger side and rear corner of the pickup truck.
Figure 2D:
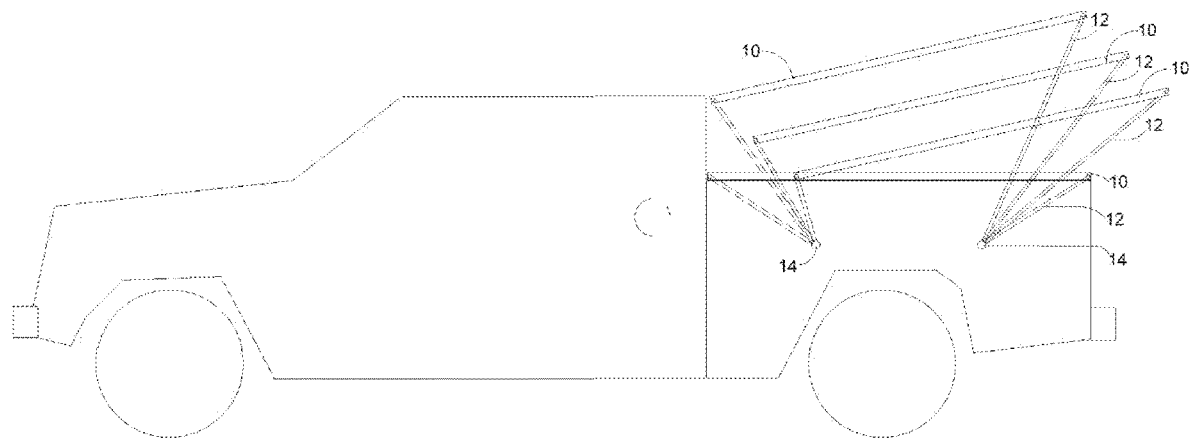
FIG. 2D is a drawing of a pickup having the tonneau cover of FIG. 1A where forward and rear pairs of the elevators and pivots on the driver side are extended to various degrees to direct the surface of the solar panel to the front of the pickup truck at three positions to minimize the shadow of the cab of the pickup truck.
Figure 3A:
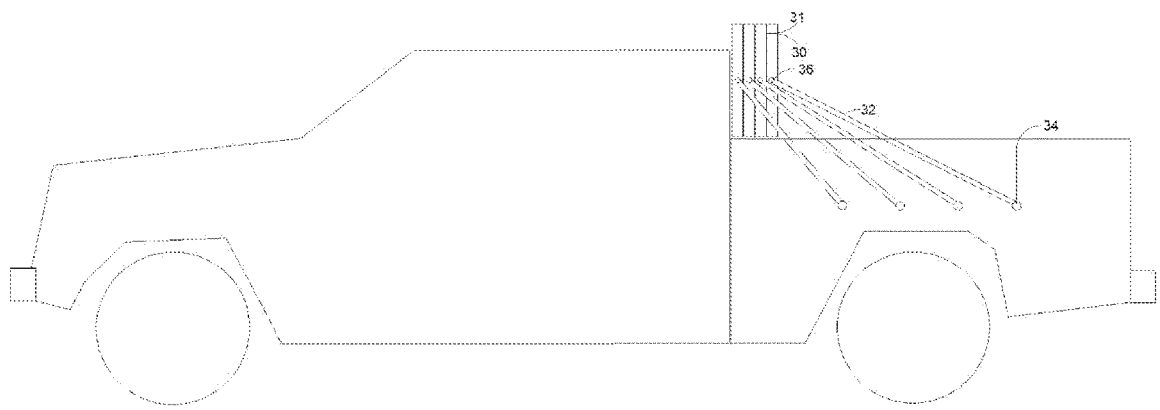
FIG. 3A is a drawing of a pickup having the tonneau cover including four solar panels where each panel is separately positional by a pair of central elevators, pivots, and lockable rotation axis connected to or in the sides of the bed where the panels are positioned to expose most of the bed.
Figure 3B:
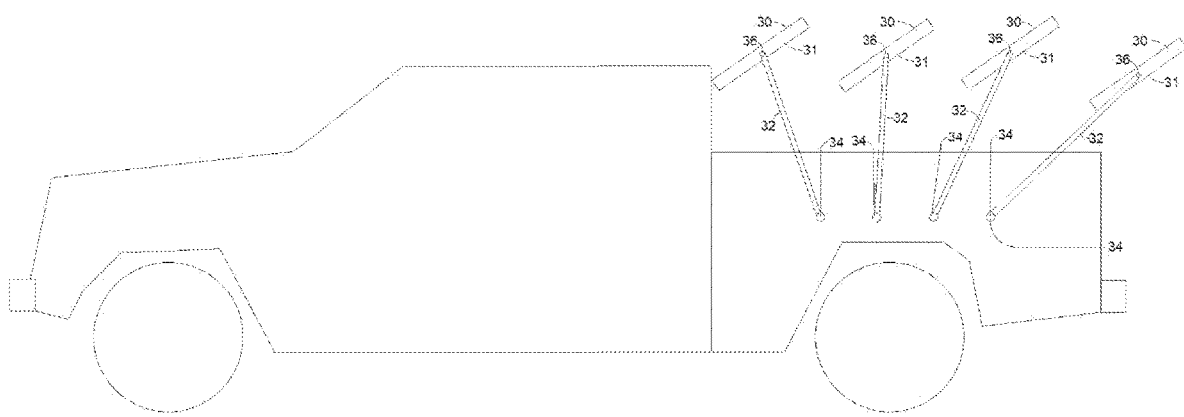
FIG. 3B is a drawing of a pickup having the tonneau cover of FIG. 3A where the panels are positioned and locked to direct the active surface of the solar panels to the front of the pickup truck with little shadow from the cab and forward panels.
Figure 3C:
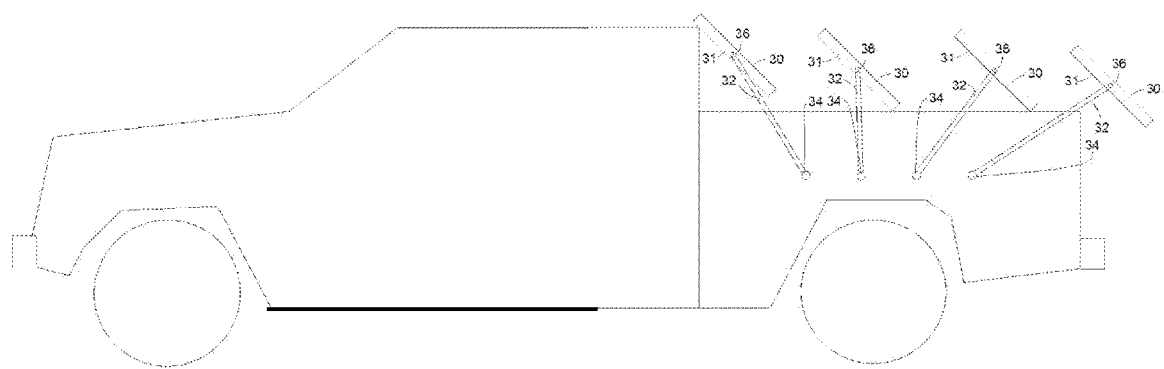
FIG. 3C is a drawing of a pickup having the tonneau cover of FIG. 3A where each panel is positioned and locked to direct the active surface of the solar panels to the rear of the pickup truck.
Figure 3D:
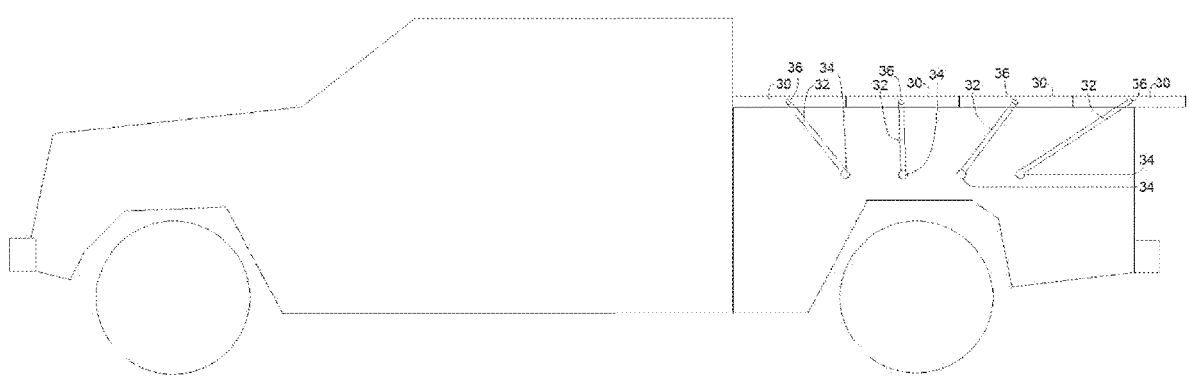
FIG. 3D is a drawing of a pickup having the tonneau cover of FIG. 3A where each panel is positioned to cover the bed where the active surface of the solar panels directly seal the bed of the pickup truck with a surface area greater than the bed.

By employing portions of the tonneau cover where each portion includes elevators that work independently, as illustrated in FIG. 2A, the at least one solar panel 10 can be elevated by the elevator 12 on the side adjacent to the cab of the pickup truck to the height of the cab's roof at approximately a 12-degree angle, although not limited to this edge height or angle relative to the bed, to receive sun light more directly while traveling directly away from the sun. As shown in FIG. 2B, to receive sunlight more directly while traveling approximately perpendicularly to the sun, the solar panel 10 is elevated by the elevators 12 from a side of the bed parallel to the direction of travel at approximately a 15-degree angle and keeping the panel below the top of the cab, although the side elevation and angle can be different. As shown in FIG. 2C, a panel is elevated from four elevators 12 to differing degrees to optimize the sunlight absorption of the solar panel 10 when the sunlight is not parallel or perpendicular to the pickup truck's length. As shown in FIG. 2D, elevation of the panel 10 using the forward elevators 12 on the cab side to the height of the cab's roof and elevation of the elevators 12 of the bed's gate side to position the solar panel to approximately a 12-degree angle to receive sun light more directly while traveling directly into the sun. By the correct elevation by the elevators 12 and rotation around the pivots 14, the leading cab edge is transposed back on the bed with elevation and rotation of the elevators 12 from the bed, the ultimate height of the tonneau cover can be controlled such that optimization of efficiency and range of the vehicle can be effected for maximized sunlight absorption, minimized drag, and maximized traction of the wheels. The edges of the one or more panels can be connected with an edge cover panel or sheet, not shown, that can be rigid or flexible such that the contents of the bed can be shielded and air flow can be controlled with respect to the underside of the panel(s) or bed contents can be protected from precipitation.

Where multiple panels are employed in the tonneau cover, the individual panels can be unhinged or in some fashion physically or mechanically connected. These panels may be separate entities electrically or can be electrically connected in series or parallel. As shown in FIGS. 3A through 3D, by employing a plurality of uncoupled panels 30, where the feature number 30 also indicates the primary light absorbing face, with pairs of central elevators 32, pivots 34, and rotation axis 36 such that the panels 30 can extend from an open bed orientation (FIG. 3A) to a fully closed bed orientation (FIG. 3D), where the panels 30 are shown to combine to a cover that extends beyond the end of the bed when closed. The elevators can be extended and retracted by hydraulic, magnetic, or mechanical means. The pivots 34 and rotation axis 36 allow the panels to be oriented and fixed at advantageous angles to maximize sunlight absorption by the panel 30. The individual panels, as illustrated in FIG. 3B have a second light absorbing face 31 oriented towards the front of the pickup truck and in FIG. 3C having the second light absorbing face 31 oriented to the rear of the pickup truck, and a non-absorbing side; although light absorbing faces 30 and 31 can reside on both sides of the panels 30 such that one receives direct light and the other receives reflected light at any particular orientation and the possible positional configurations is greater by allowing either face 30 or 31 to be the direct light receiving surface. Feedback from light sensors, typically but not necessarily a multiplicity of three or more sensors, situated on or remote to each panel 30 can permit a controller to automatically change the position and orientation of the panels to optimize power generation when the panels 30 of the tonneau cover do not need to be constantly fixed for optimization of security, payload protection, wind shear, or other factors that lessen the priority of changing orientation to optimize solar power generation.

Figure 4A:
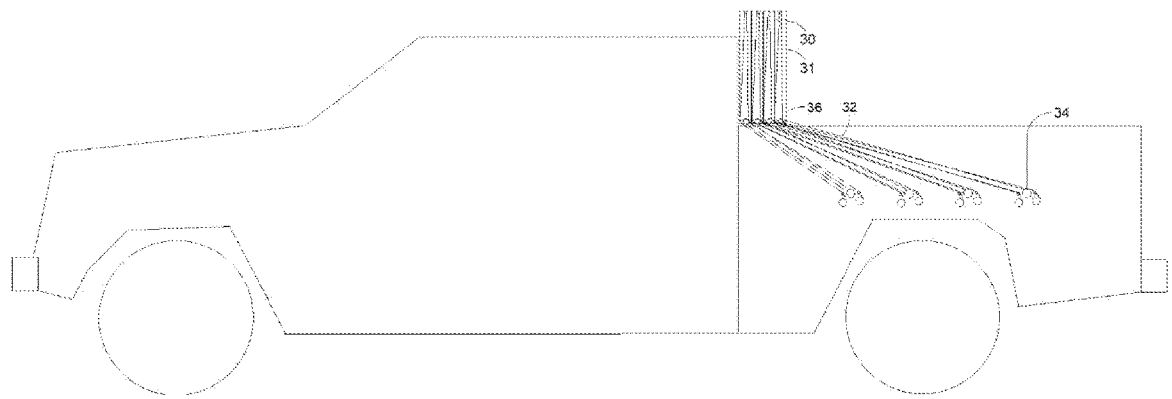
FIG. 4A is a drawing of a pickup having the tonneau cover including four solar panels where each panel is positional by a pair of separate front edge elevators, pivots, and lockable rotation axis where the panels are positioned and locked via a pair of adjustable cables to expose most of the bed.
Figure 4B:
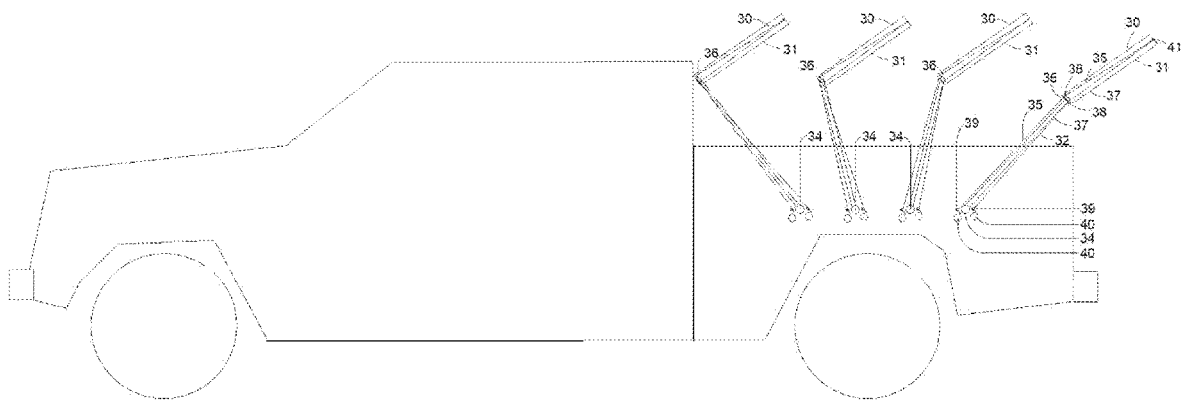
FIG. 4B is a drawing of a pickup having the tonneau cover of FIG. 4A where the panels are positioned to direct the active surface of the solar panels to the front of the pickup truck with little shadow from the cab and forward panels where the panels are positioned and locked via a pair of adjustable cables.
Figure 4C:
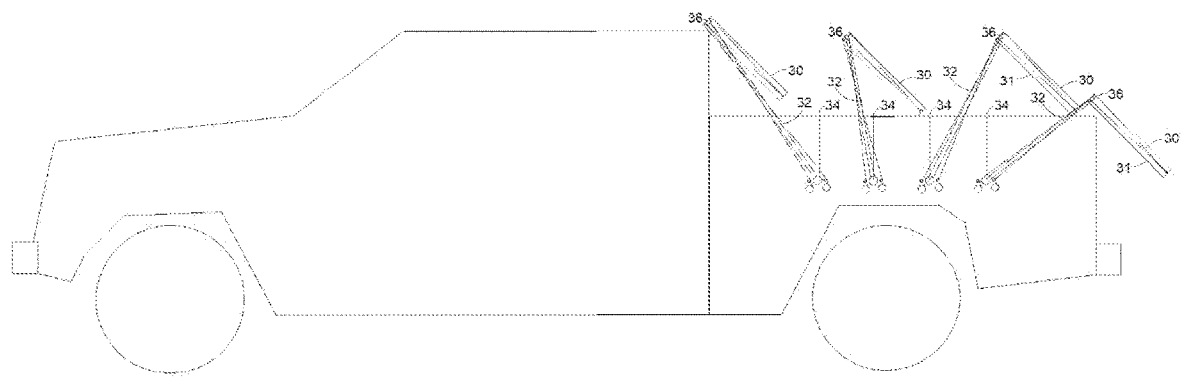
FIG. 4C is a drawing of a pickup having the tonneau cover of FIG. 4A where each panel is positioned to direct the active surface of the solar panels to the rear of the pickup truck with little or no shadow from the rear panels on other panels when the panels are positioned and locked via a pair of adjustable cables.
Figure 4D:
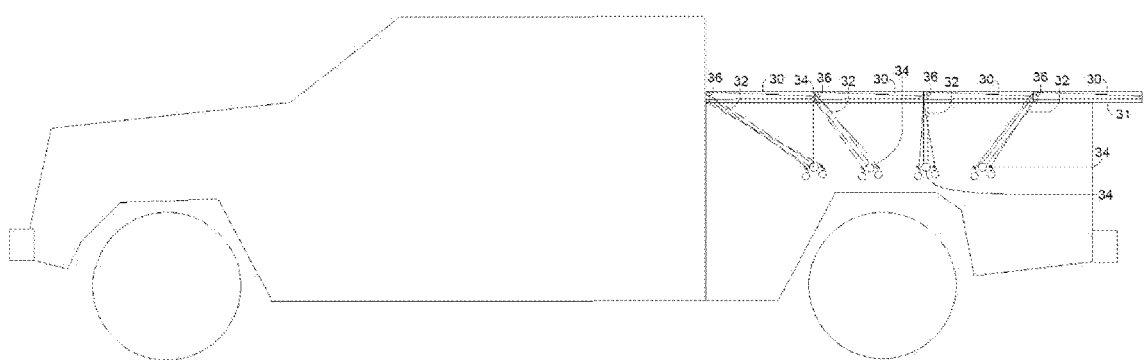
FIG. 4D is a drawing of a pickup having the tonneau cover of FIG. 4A where each panel is positional to cover the bed where the active surface of the solar panels directly cover the bed of the pickup truck with a surface area greater than the bed.

As shown in FIGS. 4A through 4D, by employing a plurality of uncoupled panels 30 with pairs of elevators 32, pivots 34, and rotation axis 36 such that the panels 30 can extend from an open bed orientation (FIG. 4A) to a fully closed bed orientation (FIG. 4D), where the panels 30 are shown to combine to a cover that extends beyond the end of the bed when closed. The forward edge located rotation axis 36 allow the panels to be oriented and fixed at advantageous angles to maximize sunlight absorption by the panel 30. By use of a forward panel rotation axis 36 rather than a central panel axis, as in FIGS. 3A-3D, some additional positional degrees of freedom to orient are achieved, particularly when both light absorbing faces 30 and 31 of panel 30 can receive light. The individual panels, as illustrated in FIG. 4B have a light absorbing face 30 oriented towards the front of the pickup truck and in FIG. 4C having the light absorbing face 30 oriented to the rear of the pickup truck, and a non-absorbing side 33 or a secondary absorbing face 31 to receive some reflected light; can reside on the side of the panels 30 opposite face 30. As shown in FIG. 4B, the rotation axis 36 can be oriented, fixed, and/or reinforced with a pair of sun facing and cables or chains, 35 and 37, respectively, that can be fixed to a securing post 41, fastener, or other means at a position extended from the rotation axis 36, for example, at the end of the common side distal to the rotation axis 36 of the panel 30. The cables or chains can be oriented by pulleys or guides 38 and 39 adjacent to the rotation axis 36 and the pivot 34, respectively, with the tension and length of the cables or chains 35 and 37 being controlled by reels 40 or other mechanisms to allow for extending, contracting, and braking the movement of the cables or chains 35 and 37. In this manner, feedback from light sensors, typically but not necessarily a multiplicity of three or more sensors, situated on or remote to each panel 30 can permit a controller to automatically change the position and orientation of the panels to optimize power generation when the panels 30 of the tonneau cover do not need to be fixed for security, payload protection, wind shear, or other factors that lesson the priority of changing orientation to optimize solar power generation.

Figure 5A:
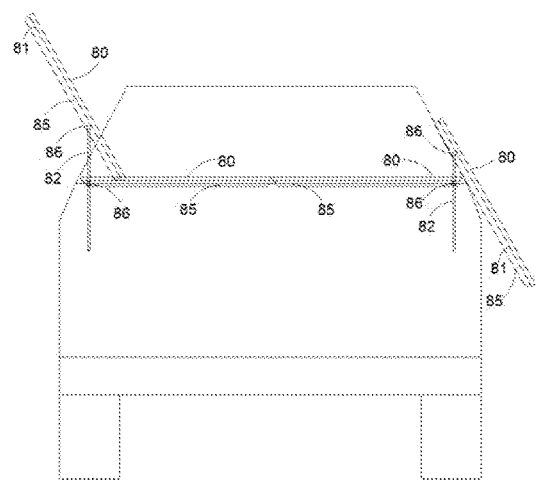
FIG. 5A is a drawing of tonneau cover observed from the rear of a pickup truck that includes eight solar panels that are paired from front to back and where each panel is raised or lowered by a pair of same side edge elevators that connect to a lockable rotation axis situated within a channel for translation of the panels from side to side and are positioned to receive sunlight that is low on the horizon and strikes the passenger side of the pickup truck.
Figure 5B:
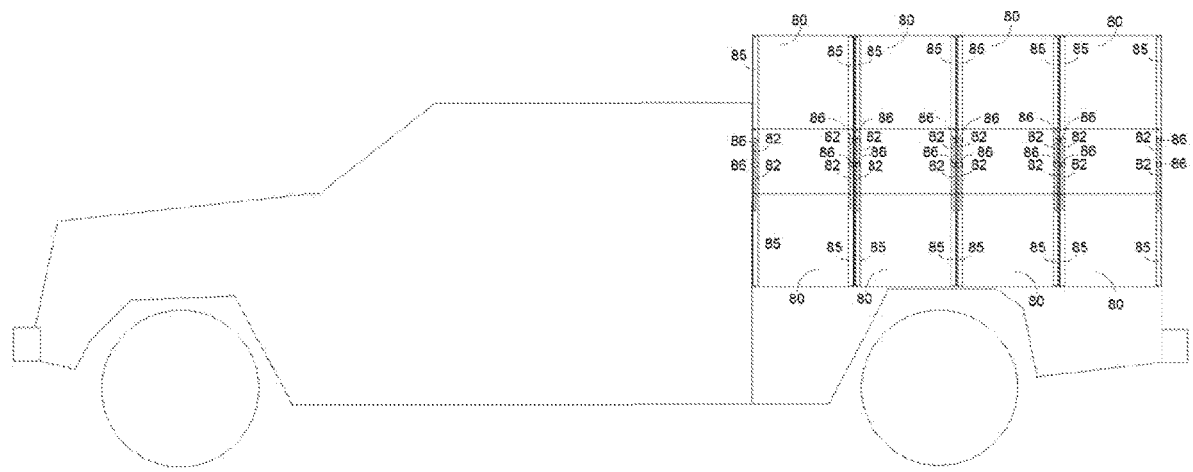
FIG. 5B is a drawing of a pickup having the tonneau cover of FIG. 5A observed from the driver side of the pickup truck and with the panels repositioned to receive sun striking the driver side of the pickup truck.

As shown in FIGS. 5A and 5B, a tonneau cover can include multiple solar panels 80, also indicating the primary light receiving face, with the tonneau cover exemplary shown as eight portions having solar panels that are joined at the center of the bed and each solar panel extends upward by two elevators 82 fasten on the sides of the bed to each panel. The elevators 82 only travel vertically and connect to a lockable axis 86 that resides in a channel 85 that permits the solar panel to translate by the transposition of the axis 86 within the channel 85 before locking. In this manner the solar panels can be extended along the sides of the bed at a sharp angle, shown as thirty degrees to vertical. The angles of the solar panels 80 from the front to back of the bed can be angled by the difference in height of the two elevators 82. The panels can have a secondary solar cell comprising light absorbing face 81, although the available area of light absorbing face 81 is necessarily smaller than that of face 80 to accommodate the channels 85. Alternatively, the channels 85 can be on the edges and not a face, allowing a larger surface area for the second light absorbing face 81.

The solar panels can be coupled via extendable and contractible covers to retain coverage of the pickup truck bed by the tonneau cover for all possible orientations of the panels. The panels can include or be augmented by active or passive inlet and outlet ports to minimize pressure differentials of the protected cavity of the bed with that external to the solar panels to lesson stresses imposed by the elements or the movement of the vehicle, such as heating of the bed. By knowledge of a journey's path, road conditions, and weather conditions to be encountered, the timing and extent of the orientation of panels can be controlled to avoid undesired forces during cornering, descents, or other actions encountered during travel. The operator can be advised by the output device for vehicle orientation for the topography and site where the parking of a vehicle will occur for an anticipated time so that maximum charging can be achieved.

Conventional photovoltaic cells need not be used and concentric photovoltaic cells with efficiencies that reach about 35 percent or more can be used. Concentric photovoltaic cells may be employed where arrays of lenses, micro-lenses, Fresnel lenses, mirrors, and/or mirror coated lenses and/or waveguides may be incorporated to concentrate the light at solar cells that are arranged in arrays on the face of the panel and/or on one or more of the panel's edges. Such features permit an increase of the absorbance and efficiencies that are independent of the azimuth angle and more inclusive of the altitude angle. By a combination of concentric photovoltaic panels and the ability to orient, elevate, and transpose the one or more panels, an optimal absorbance can be achieved for any direction, pitch, or time with daylight when the pickup is in motion or parked. A pickup truck with a tonneau cover, which has concentric cells and can be oriented to 45 degrees and oriented in any direction relative to the direction of travel, can extend the amount of day light with a favorable altitude, verses that of a conventional solar cell capable of being oriented to 35 degrees in any direction, or a flat concentric cell that is traveling north or south on flat lands. For example, the time can be extended from about two hours to about ten hours at the winter solstice near Tampa Fla. and from about four hours to nearly 12 hours at the equinox near Seattle, Wash.

The orientation of the solar cells to optimize the power generation can be via light sensors, for example light sensing LEDs, mounted on at least three positions on each panel or from at least three common light sensor mounted remotely and sufficiently configured for direction such that one or more controllers can direct and move the panels and portions of the panels to achieve an optimal generation for the conditions, pitch, and direction of travel. Measurement of the power generation of the panel can additionally or alternatively be used to align the cells.

The sensors for rain, wind, temperature, motion, direction, location, and/or light can input signals to one or more controllers and CPUs such that certain responses can be performed semi-autonomously from other functions. For example, light sensors can input light intensity to a controller that controls the position and orientation of solar panels independently of a controller that only provides signals for activation of the panel orientation process for factors other than energy harvesting that must be fulfilled for a pickup truck. One or more sensors, such as cameras, image, motion, and vibration sensors, can be used to assess the presence and actions of animals or people in the vicinity of the vehicle, and to activate closure of a tonneau cover to its most secure state to protect from damage or other intrusion to the pickup truck, its cargo, and the tonneau cover.

Figure 6:
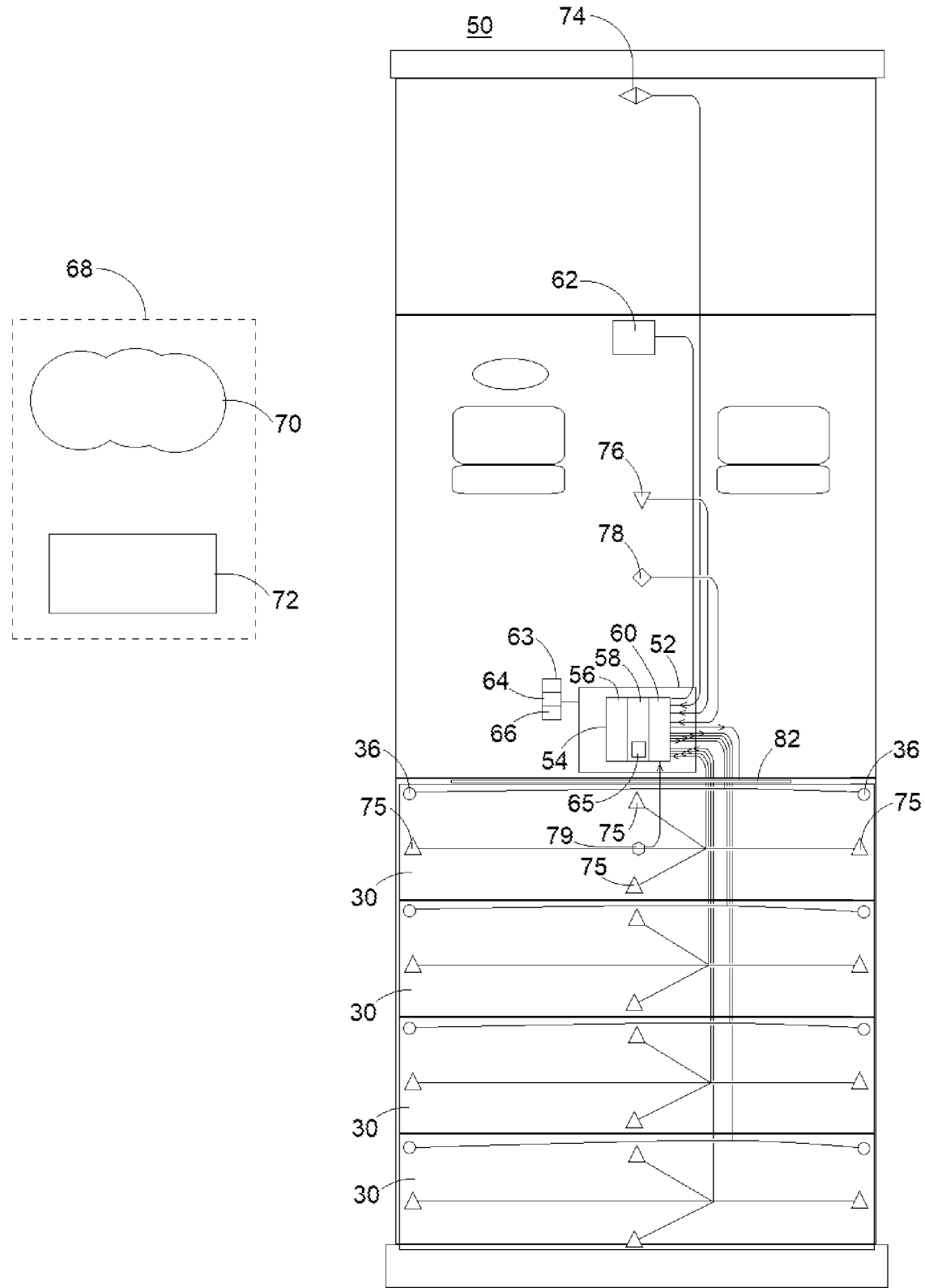
FIG. 6 is an exemplary schematic view illustrating a pickup truck with a smart tonneau cover having an ability to receive location and weather information, a plurality of sensors to detect cargo information and conditions of the external environment in a system configured to determine the optimal configuration of the portions of the tonneau cover and to automatically place the portions in the optimal configuration.

With reference to FIG. 6, the pickup truck 50 can include a vehicle controller or vehicle control system 52, which generally includes a at least one control module 54 with at least one processor 56, at least one data store or memory 58, and at least one interface system 60. The control module 54 and/or processor 56 can be a portion of a central vehicle control, as part of an input unit 62 that can be networked to information receiving systems, such as cloud-based systems and GPS systems. In one or more aspects, the processor(s) 56 can be a main processor of the vehicle. For instance, the processor(s) 56 can be an electronic control unit (ECU). The data store 58 can include volatile and/or non-volatile memory. Examples of suitable data stores 58 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 58 can be a component of the control module 54 or processor(s) 56, or the data store 58 can be operatively connected, either directly or indirectly connected, to the processor(s) 56 for use thereby. The data store 58 may contain the algorithms or operational software 65.

In various aspects, the interface system 62 can be configured to work as a combination with portions that may be referred to as an input system and an output system. An "input system" includes any device, component, system, element or aspect or groups thereof that enable information/data to be entered into a machine. The input system can receive an input from a vehicle passenger through various known input devices. An "output system" includes any device, component, or arrangement or groups thereof that enable information/data to be presented to a vehicle passenger (e.g., a person, a vehicle passenger, etc.) through various known output devices and/or displays. The input and output systems of the interface system 62 may also facilitate a coordinated operation with other systems, such as the input from sensors 74, 76, 78, 79, and/or 80 and other vehicle systems, such as the speedometer, a compass, and any sensor of centrifugal force. The control module 54 can be in communication with another control module of the vehicle to govern or modify acceleration, maximum speed and braking and output signals to actuators for the pivots, elevators, and rotating axis 36 to modify the position and orientation of the solar panels 30 and actuators 82 for any vent(s) to adjust any orifice for air flow under the tonneau cover.

In one or more aspects, the pickup truck 50 may include one or more internal communication system 63 including at least one communication module/device 64 configured to send/receive communications between various vehicle components and vehicle systems, including the sensors 74, 76, 78, 79, and/or 75 for input of information concerning rain, air velocity, temperature, cargo height, and germane light intensity, respectively. In various aspects, the communication module/device 64 may be configured to be able to work with wireless technology for sending/receiving communication. In various aspects, the communication system 63 may also include one or more receiver device 66, configured to receive wireless communications from external devices, such as personal electronics devices. In other aspects, the present technology may be used with hardware and/or software located at remote locations 68. The remote location 68 may include a cloud server 70 or remote network 72 that communicates with the vehicle 50 using various known technologies, such as GPS service, cellular communication, or similar. In various aspects, a user may have a personal electronic device or personal communication device, such as a phone, tablet, or other smart device that can be configured to use a specific application, or "app," to communicate with at least one communication system 63 to exchange data or information related to the present technology, including for example, receiving push notifications, text messages, instant messages, and the like.

Figure 7:
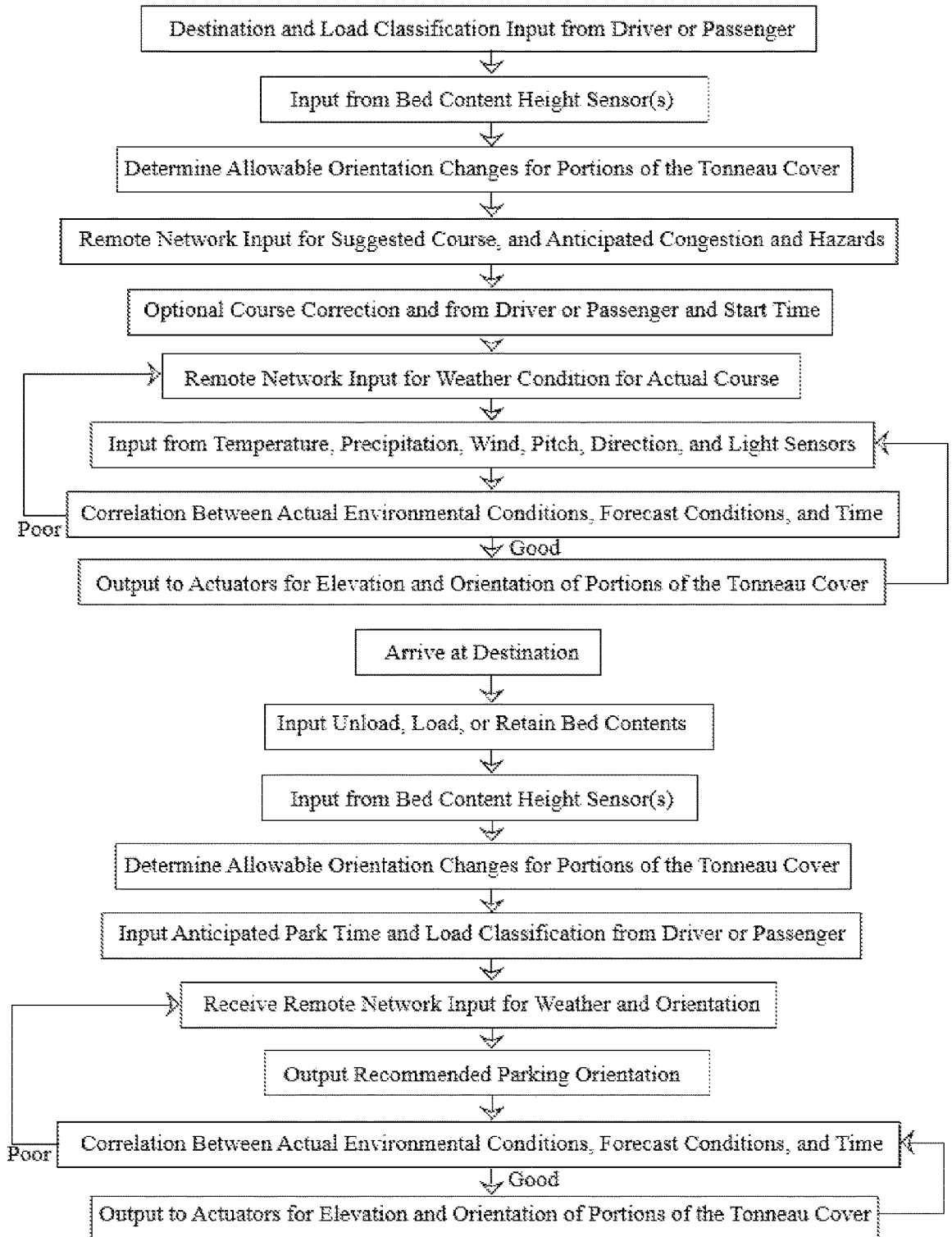
FIG. 7 shows an exemplary flowchart illustrating one exemplary method of operations for optimizing the automated positioning of the components of the automated tonneau cover.

FIG. 7 is a flowchart illustrating one exemplary method of operation, the method may begin by inputting a load classification containing information concerning the quality and quantity of the cargo and one or more trip destinations from the user, generally, but not necessarily a driver or passenger. The process of monitoring a plurality of sensors of the external environment and the condition and orientation of the pickup truck begins with the assessment of the height of the load in the bed using one or more sensors situated within the bed to assess the load height and an assessment of the allowable heights and orientations that are accessible by the tonneau cover and its solar cell(s).

Remote information is accessed to provide data concerning the road hazards and anticipated weather conditions for an automatically proposed trip route to the destination. The suggested trip itinerary from GPS based and/or other remote sources is accepted or corrected by the user and a start time is provided by a user input or automatically, for example, by the starting of the engine or taking the vehicle out of park. The remote information provides data concerning the road hazards and anticipated weather conditions for the trip where that data is correlated with the conditions determined by the sensors on the pickup truck. Sensors are strategically located throughout the vehicle, including the tonneau cover, and one or more signals is correlated with the remote data. Once at least one signal is received, the processor carries out the programmed method to determine from the time of day, state of the environment, expected weather conditions, course for the vehicle, and the limits of orientation for the portions of the tonneau cover, the appropriate signal to actuators to open or close vents and reorient the positions of the solar panels as is required for protection of the load and vehicle and to optimize power generation during travel and when the vehicle is stationary. The data from remote information is updated as needed and correlated with the sensed conditions.

Upon arrival at a destination, the state of loading, unloading, or retention of the cargo can be indicted to the control system, and upon determination that any actions of unloading and/or loading are complete, the loads disposition is input with an anticipated parked period and the expected weather and wind for this period, after which, the best of possible parking orientations can be provided to the driver. The tonneau cover can then be oriented to best protect the cargo and the solar cells can oriented to generate power as needed or for charging.

The foregoing description is provided for purposes of illustration and description and is in no way intended to limit the disclosure, its application, or uses. It is not intended to be exhaustive or to limit the disclosure. Individual elements or features of a particular embodiment are generally not limited to that embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A smart tonneau cover for a pickup truck, comprising:
    at least one input system;
    at least one sensor selected from at least one bed temperature sensor, at least one precipitation sensor, and at least one air flow sensor;
    at least one actuator to adjust a height, a position, and/or an orientation of at least one portion of the smart tonneau cover; and
    at least one controller informationally coupled to the at least one input system, the at least one precipitation sensor, the at least one air flow sensor, and to the at least one actuator, wherein the controller directs the at least one actuator based on at least one signal received from the at least one input system and the at least one sensor.

2. The smart tonneau cover according to claim 1, wherein the input system is informationally coupled to at least one of a user interface, a GPS receiver, and a weather service receiver.

3. The smart tonneau cover according to claim 1, wherein the precipitation sensor and the at least one air flow sensor reside on the smart tonneau cover.

4. The smart tonneau cover according to claim 1, wherein the at least one controller comprises at least one processor, at least one data store or memory, and at least one interface system, wherein the controller independently directs each of the at least one portion of the smart tonneau cover.

5. The smart tonneau cover according to claim 1, further comprising at least one cargo height sensor informationally coupled to the at least one controller wherein a minimal height of each of the at least one portion of the smart tonneau cover is directed by the at least one controller as informationally coupled to the at least one cargo height sensor.

6. The smart tonneau cover according to claim 1, wherein at least one portion of the smart tonneau cover comprises at least one vent wherein the at least one controller directs a degree of opening of the at least one vent.

7. The smart tonneau cover according to claim 1, wherein at least one portion of the smart tonneau cover comprises at least one solar panel wherein the at least one solar panel is oriented as directed by the at least one controller based on at least one data from the at least one input system.

8. The smart tonneau cover according to claim 7, wherein the solar panel comprises at least one light sensor and wherein the at least one controller further orients the at least one portion of the smart tonneau cover from at least one light signal from the at least one light sensor.

9. The smart tonneau cover according to claim 7, comprising a plurality of portions, wherein each portion of the smart tonneau cover comprises at least one solar panel and each of the plurality of portions is independently orientable.

10. The smart tonneau cover according to claim 7, wherein the at least one portion of the smart tonneau cover is adjustable from a first height below a top of a bed of the pickup truck to a second height above a roof of a cab portion of the pickup truck.

11. The smart tonneau cover according to claim 1, further comprising at least one bridging panel and/or sheet disposed between at least two portions of the smart tonneau cover, or between the at least one portion of the smart tonneau cover and the pickup truck.

12. A method of enhancing a range and optimizing a power efficiency of a pickup truck comprising a smart tonneau cover, the method comprising:
    inputting at least one of:
        a cargo height in a bed of the pickup truck;
        a destination and a start time in an input system;
        at least one power efficient route to the destination and an anticipated weather at an anticipated time along each of the at least one power efficient routes; and
    selecting from the power efficient routes an optimal route;
    measuring an average temperature within the bed of the pickup truck from at least one temperature sensor;
    measuring a precipitation with at least one precipitation sensor;
    determining a wind direction and a wind intensity using at least one air flow sensor; and
    optimizing a power efficiency by adjusting a height, a position, and/or an orientation of at least one portion of the smart tonneau cover with at least one actuator connected to the at least one portion of the smart tonneau cover where adjusting depends on the cargo height and is in response to a change in: a direction of the pickup truck; a pitch of the pickup truck; and/or a weather condition.

13. The method according to claim 12, further comprising directing air under and/or around the smart tonneau cover using at least one vent in at least one portion of the smart tonneau cover.

14. The method according to claim 12, wherein at least one portion of the smart tonneau cover comprises at least one solar panel, and the method further comprises receiving a light intensity from at least one light sensors and generating electrical energy using at least one solar panel.

15. The method according to claim 14, wherein adjusting of the height, the position, and/or the orientation of at least one portion of the smart tonneau cover is automatically performed by optimizing the light intensity at the at least one light sensors.

16. The method according to claim 15, wherein the smart tonneau cover comprises a plurality of portions, and adjusting the height, the position, and/or an orientation of each portion of the smart tonneau cover is performed independently.

17. A pickup truck comprising a smart tonneau cover, the smart tonneau cover comprising:
    at least one input system;
    at least one sensor selected from at least one bed temperature sensor, at least one precipitation sensor, and at least one air flow sensor;
    at least one actuator to adjust a height, a position, and/or an orientation of at least one portion of the smart tonneau cover; and
    at least one controller coupled to the at least one input system and the at least one sensor, wherein the controller directs the at least one actuator based on at least one signal received from the at least one input system and/or the at least one sensor.

18. The pickup truck according to claim 17, wherein at least one portion of the at least one portion of the smart tonneau cover comprises at least one vent wherein the at least one controller directs a degree of opening of the at least one vent based on at least one signal from the at least one sensor.

19. The pickup truck according to claim 17, wherein at least one portion of the at least one portion of the smart tonneau cover comprises at least one solar panel wherein the at least one portion of the smart tonneau cover comprising the at least one solar panel is oriented as directed by the at least one controller based on a data from the at least one input system.

20. The pickup truck according to claim 19, wherein the at least one solar panel comprises at least one light sensor and wherein the at least one controller further orients the at least one portion comprising the at least one solar panel in response to at least one light signal from the at least one light sensor.

* * * * *